UNITED STATES PATENT OFFICE.

CHARLES A. DOREMUS, OF NEW YORK, N. Y.

PROCESS OF OBTAINING ALUMINA.

SPECIFICATION forming part of Letters Patent No. 725,683, dated April 21, 1903.

Application filed March 22, 1901. Serial No. 52,321. (No specimens.)

*To all whom it may concern:*

Be it known that I, CHARLES A. DOREMUS, a citizen of the United States, residing in the borough of Manhattan, city, county, and State of New York, have invented a new and useful Process of Obtaining Alumina, of which the following is a specification.

The object of my invention is to produce anhydrous alumina.

Practically all the anhydrous alumina now in the market is obtained by treating bauxite with an alkali, followed by the calcination of the hydrate. This alkali process cannot be used in the case of the clays and kaolins or with the silicious bauxites. A comparatively small quantity of alumina is produced by the calcination of the oxysalts such as the sulfate. By my improved process I am able to separate the alumina from each of these materials, as well as from the other bauxites.

I make use of the reversible reaction indicated by the chemical equation

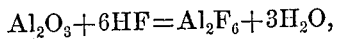

$$Al_2O_3 + 6HF = Al_2F_6 + 3H_2O,$$

hydrofluoric acid being employed as an intermediate agent by causing it to react repeatedly to convert fresh quantities of alumina into a fluorid and to form hydrofluoric acid and alumina when this fluorid is acted upon by superheated steam.

I first prepare aluminium fluorid from clay, kaolin, bauxite, or other suitable aluminous materials and an acid containing fluorin, which may be hydrofluoric acid or hydrofluorsilicic acid, and usually make it porous. I then place this fluorid in a retort and therein subject it to the action of superheated steam. The reaction begins promptly, hydrofluoric acid is evolved, and by an attachment of the retort is conducted to a leaden condenser and is there condensed. The residue remains in the retort until the evolution of the acid is complete, in which event such residue is alumina. If desired, the residue may be removed from the retort before the evolution of the acid is complete.

The strength of the hydrofluoric acid will vary with the quantity of steam used; but it is easily made of a strength sufficient to serve directly for the production of a fresh quantity of aluminium fluorid.

The yield of acid from the fluorid is equal to the theoretical yield. The loss of the reagent is small in the entire process and can be made good by adding fresh acid.

I do not limit my process to using a retort in heating the fluorid. I have effected its decomposition in furnaces of other types.

What I claim as new, and desire to secure by Letters Patent, is—

The process of obtaining alumina by first reacting upon aluminous material, such as specified, with an acid containing fluorin, thereby producing aluminium fluorid, and then subjecting such fluorid to the action of superheated steam, substantially as described.

CHARLES A. DOREMUS.

Witnesses:
CORNELIUS KELLEHER,
ADOLPHUS D. PAPE.